United States Patent [19]

Rapoport

[11] 3,900,575

[45] Aug. 19, 1975

[54] PREPARATION OF COATED HAMS

[75] Inventor: Joseph Rapoport, Montreal, Canada

[73] Assignee: Hygrade Foods Inc., Montreal, Canada

[22] Filed: Aug. 6, 1974

[21] Appl. No.: 495,277

[52] U.S. Cl. .................. 426/305; 426/92; 426/212; 426/302; 426/380
[51] Int. Cl. ......................... A22c 18/00; A23b 1/00
[58] Field of Search ....... 426/90, 92, 212, 302, 305, 426/307, 380, 382

[56] References Cited
UNITED STATES PATENTS

| | | | |
|---|---|---|---|
| 2,860,990 | 11/1958 | Guthrie | 426/380 |
| 2,905,561 | 9/1959 | Barnett et al. | 426/90 |
| 3,753,741 | 8/1973 | Stewart | 426/382 |
| 3,792,173 | 2/1974 | Glabe | 426/92 |

*Primary Examiner*—Hyman Lord
*Attorney, Agent, or Firm*—Christen & Sabol

[57] ABSTRACT

A cooked ham is prepared having a unique adherent, uniform rich brown sweet coating. The ham is deboned, trimmed, defatted, cured, molded and cooked in the usual manner. A viscous caramel liquid is then applied to all surfaces of the ham and the caramel coated ham is immersed in a deep-fat fryer for a short time to crisp the caramel coating.

6 Claims, No Drawings

3,900,575

PREPARATION OF COATED HAMS

BACKGROUND OF THE INVENTION

1. Field of the Invention

This invention relates to the preparation of hams for the table and more particularly to a cooked ham having an adherent, uniform rich brown sweet coating thereon.

2. Description of the Prior Art

Boned and cooked hams have long been an important food item since they can be purchased ready for serving and are easily stored. Hams which have additional flavour added have long been popular with consumers and this additional flavouring is normally provided by sugars or spices. However, there are difficulties in trying to provide a sugar coating on hams, and the main problem is poor adherence of the sugar to the ham, resulting in a very blotchy uneven appearance to a sugar coated ham. As an example of an attempt to apply sugar to a ham there can be mentioned Guthrie, U.S. Pat. No. 2,860,990, issued Nov. 18, 1958, in which a thick layer of sugar is placed on top of the ham held in place in a blanket of cheesecloth and the sugar is in this position wetted to form a sticky heat liquifiable paste that slowly exudes through the cheesecloth on to the surface of the ham. Obviously, great difficulty will be encountered in obtaining a uniform coating of sugar on the ham by this technique.

Reference can also be made to Stewart, U.S. Pat. No. 3,753,741, issued Aug. 21, 1973, which discusses the use of honey in association with cooked ham, but in this case the ham has been sliced after cooking and the honey is used to aid in binding the meat slices together and thereby eliminating the necessity for additional binders such as string and the like.

However, none of these prior patents were of any real benefit in terms of developing a process for forming an adherent and uniform rich brown sweet coating on a precooked ham. It is therefore, the object of the present invention to provide such a coated ham.

SUMMARY OF THE INVENTION

In the method of the present invention a ham is prepared in the usual manner, including deboning, trimming, curing and defatting. The thus prepared ham is pressed and molded into a container, and then cooked. After cooking, the ham is removed from the container and cooled, and, in accordance with the novel feature of the present invention there is applied to all surfaces of the cooked ham a viscous caramel liquid. The ham with this viscous caramel coating is then subjected to deep-fat frying, which crisps the caramel coating and forms a very pleasant tasting, adherent and uniform rich brown coating of the ham.

In order that the caramel will adhere uniformly to the ham prior to deep-fat frying, it will be evident that it must be in a quite viscous form. The degree of viscosity necessary can be readily determined and a highly satisfactory caramel liquid for this purpose can be prepared by mixing together approximately equal proportions of commercial caramel powder and water.

Since the deep-fat fried caramel produces a rather unique flavour, it may in some instances be desirable to produce a flavour closer to the traditional sugar-coated hams. This can be done by rubbing all surfaces of a ham with brown sugar prior to the application of the caramel and also by adding to the caramel liquid a small amount of brown sugar, e.g., up to about 5% by weight based upon the caramel powder.

The deep-fat frying can be conducted at typical deep-fat frying temperatures, e.g. 350° to 400°F., and a satisfactory product can be obtained with quite short frying times, of, for example, about 30 seconds to 3 minutes.

After the hams are removed from the deep-fat fryer they are thoroughly chilled, preferably to a temperature below 32°F., and are packed in sealed containers, e.g., Cryovac shrink-bags, for marketing.

In terms of appearance it may be desirable to cut a slice from one side of the coated ham so as to expose one non-fried surface prior to packing in the cryovac shrink-bags.

DESCRIPTION OF PREFERRED EMBODIMENT

A specific commercial procedure which has been used in the production of coated hams based upon the present invention is described in the following example, it being understood that this example is not to be construed as limiting the appended claims.

EXAMPLE 1

Hams were prepared in the usual manner by skinning and defatting to approximately ⅛ inch external fat covering and removal of bones and all primary pockets of internal fat. The hams were then injecto-pumped with curing solution to comply fully with Meat Inspection Regulations. After an approximate 48 hour cure, the hams, which on average weighed about 5 pounds following curing were pressed into "D"-shaped mold cans under vacuum and formed with a ham press and then vacuum sealed. These mold cans containing the hams were then cooked in hot water.

After cooking, the cans were opened and the hams removed. The hams were then rubbed with brown sugar on all surfaces and following this a caramel dip was applied to all sides of the ham. The dip was applied with a modified battering attachment of a Stein-Breading machine in which the hams were carried on a conveyor which dipped the bottom of each ham into the caramel liquid while the tops and sides were sprayed. The caramel dip which was used was a thoroughly blended mixture of about 15 pounds caramel powder, about 5 ounces brown sugar and about 15 pounds of water.

The caramel dipped hams then proceeded to a deep-fat fryer where they were carried by a conveyor through a high quality deep frying vegetable oil, e.g., corn oil, maintained at 380°F. Each ham was submerged in the frying oil for approximately 1½ minutes.

Following the deep-fat frying the hams were cooled in a cooler maintained at 28°F. for about 8 to 16 hours and the chilled hams were each cut to expose one non-fried surface after which they were packed in cryovac shrink-bags and stored in a cool area until shipment.

I claim:

1. A method of preparing ham which comprises deboning, trimming, curing and defatting a ham; pressing and molding the ham into a container; cooking the ham in said container; removing the cooked ham from said container; applying to all surfaces of the cooked ham a viscous caramel liquid; and deep-fat frying the caramel coated ham at a temperature of 350°F. –400°F. for about 30 seconds to 3 minutes to produce an adherent and uniform rich brown coating thereon.

2. A method according to claim 1 wherein the caramel liquid includes a minor proportion of brown sugar.

3. A method according to claim 1 wherein the caramel liquid comprises about equal parts by weight of caramel powder and water.

4. A method according to claim 2 wherein all surfaces of the cooked ham are rubbed with brown sugar prior to the application of the caramel coating.

5. A method according to claim 4 wherein the deep-fat fried coated ham is chilled and packaged in a shrink-bag.

6. A method according to claim 5 wherein the ham is cut to expose one non-fried surface prior to packaging in said shrink-bag.

* * * * *